Feb. 12, 1952 W. W. HASTINGS ET AL 2,585,123
TIRE PRESSURE GAUGE
Filed Jan. 19, 1949
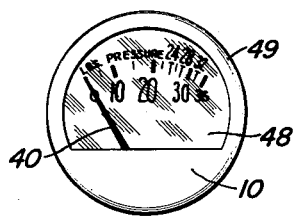
FIG. 1.
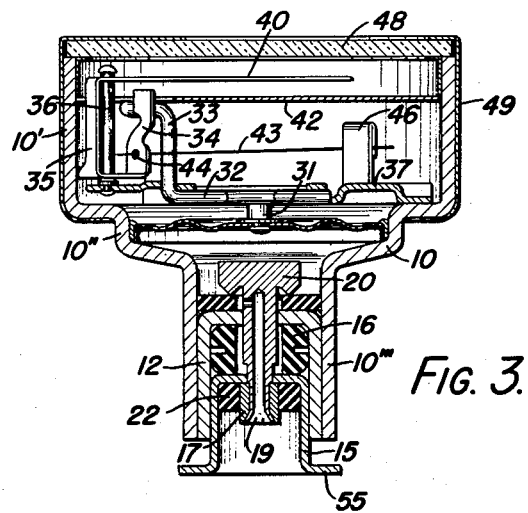
FIG. 3.
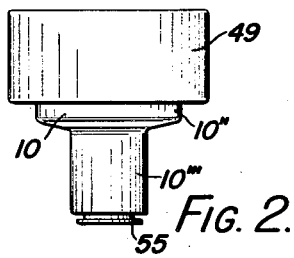
FIG. 2.
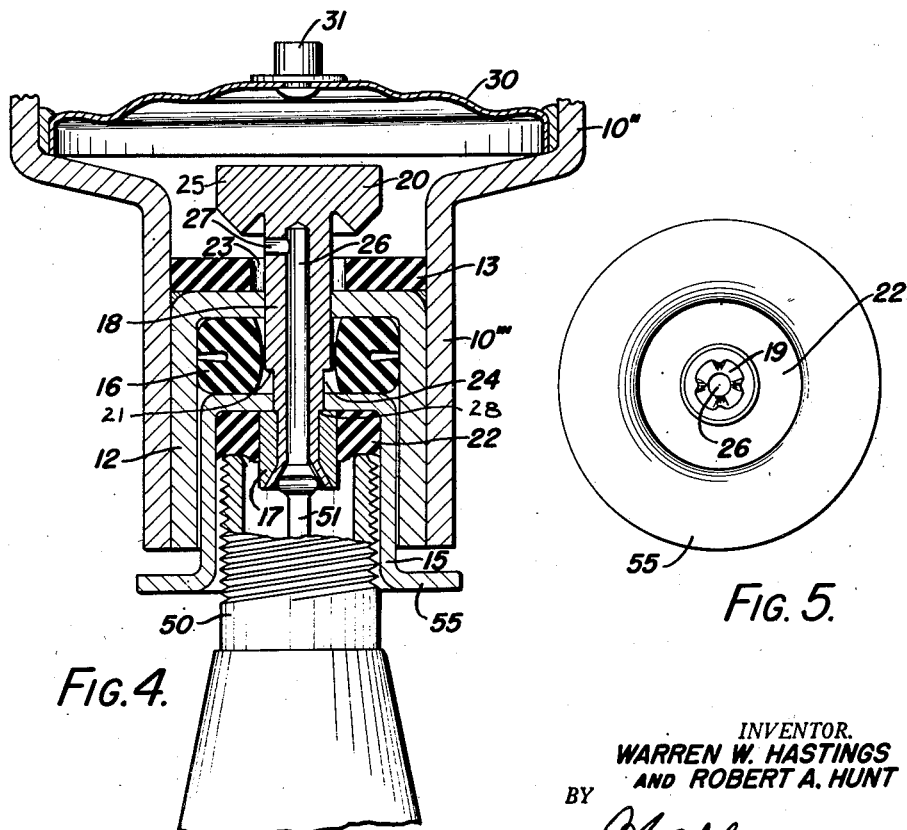
FIG. 4.
FIG. 5.
INVENTOR.
WARREN W. HASTINGS
AND ROBERT A. HUNT
BY
ATTORNEY Patented Feb. 12, 1952

2,585,123

UNITED STATES PATENT OFFICE 2,585,123

TIRE PRESSURE GAUGE

Warren W. Hastings, Brighton, and Robert A. Hunt, Greece, N. Y., assignors to Rochester Manufacturing Company, Rochester, N. Y., a corporation of New York Application January 19, 1949, Serial No. 71,748

4 Claims. (Cl. 73—396)

The present invention relates to pressure gauges and particularly to gauges for testing the air pressure in pneumatic tires.

With the so-called "low-pressure" tires which are now coming into general use, it is necessary to maintain the recommended air pressure in the tire within very close limits; otherwise the tire will wear rapidly. This means that "low-pressure" tires should be tested for air pressure much more often than it is customary to test a high-pressure tire. The motorist should provide himself with a gauge and test the tires himself frequently, not leaving the test to the occasions when he goes to a gasoline station for gasoline.

The tire pressure gauges in ordinary use may be entirely satisfactory for testing tires in a gasoline station, but are not suitable for the ordinary user. They are bulky; and ordinarily they have to be read while the gauge is applied to the tire valve. With inclined valve stems and with the various positions the valve stem is likely to assume in the rotation of a tire, this is sometimes awkward. It is certainly inconvenient for the average autoist.

A primary object of the present invention is to provide a tire-pressure gauge which will maintain the indication of the air-pressure after the gauge has been removed from the tire valve, so that the air pressure can be read with convenience with the gauge in the user's hand and without requiring a person to bend over in order to read the gauge graduations.

Another object of the invention is to provide an improved tire-pressure gauge which is simple in structure, convenient to use, and relatively cheap in cost.

Other objects of the invention will be apparent hereinafter from the specification and from the recital of the appended claims.

In the drawings:

Fig. 1 is a top plan view and Fig. 2 is a side elevation of a tire-pressure gauge constructed according to one embodiment of this invention;

Fig. 3 is an axial sectional view of the gauge on a considerably enlarged scale;

Fig. 4 is a fragmentary axial sectional view on a still further enlarged scale showing details of the lower end of the gauge and showing the positions of the gauge parts when the gauge is applied to the valve stem of a pneumatic tire and the air-pressure of the tire is being tested; and Fig. 5 is a bottom plan view of the lower portion of the gauge.

Referring now to the drawings by numerals of reference, 10 denotes the gauge housing. This has an upper cylindrical portion 10′, an intermediate cylindrical portion 10″ and a lower cylindrical portion 10‴. The upper cylindrical portion 10′ houses the indicating part of the gauge, which may be of any conventional or suitable construction.

Mounted within the lower cylindrical portion 10‴ of the housing is an inverted cup-shaped member 12 which is welded, cemented, or otherwise fixedly secured within the housing portion 10‴. Seated on top of the inverted cup-shaped member 12 and in tight-fitting contact with the internal wall of housing portion 10‴ is a rubber washer or gasket 13.

Mounted within the member 12 to slide therein is a second inverted cup-shaped member 15. Interposed between the two cup-shaped members 12 and 15 is a rubber grommet 16.

Mounted to seat upon the washer or gasket 13 is a check-valve 25. This valve has an enlarged head 20, which is adapted to seat on the resilient seating member 13, and an integral stem 18 which projects from one side of the head downwardly through aligned central holes 23 and 24 in the seating member 13 and grommet 16, respectively, and through an aligned central hole in member 15. The member 15 is adapted to have limited sliding movement on the valve stem between a shoulder 21 formed on the valve stem and a nipple or sleeve 17 that is secured to the valve stem. The nipple is immovable relative to the valve stem. The valve stem has a flared portion 19 at its lower end which seats within a conical recess formed in the sleeve or nipple; and the nipple seats against the shoulder 28 formed on the valve stem.

Mounted within the cup-shaped member 15 to surround the nipple 17 is a rubber washer or gasket 22. The gasket 22 seats tightly around the nipple 17 but may have slight clearance around its periphery relative to member 15. The valve stem has an axially extending duct 26 therein which communicates with a duct 27 that opens at one side of the valve stem just below the head 20.

As previously stated, the indicating part of the gauge and the actuating means therefor may be of any conventional or suitable construction. As shown, this comprises a flexible diaphragm 30 which is mounted within the pressure chamber formed in the intermediate portion 10″ of the housing. This diaphragm is secured at its periphery to housing portion 10″ by soldering, brazing, cementing, or in any other suitable manner. The diaphragm is connected by a pin 31 with a crank arm 32. The crank arm has an extension 33 which engages one leg 34 of a U-shaped member 35. This member is mounted to pivot upon a pin 36 that is secured in a plate 37 which is fastened in any suitable manner within the upper portion 10' of the housing 10. The U-shaped member 35 has an indicating needle or pointer 40 formed integral with it. This pointer is adapted to read against graduations provided on a dial 42 which is secured in any suitable manner within part 10' of the housing. The pointer 40 is normally held in its zero position by a spring wire 43 which is mounted at one end within a hole in the arm 34 of U-shaped member 35 and which is secured at its opposite end to a lug 46 that may be struck up from plate 37. A glass 48 and bezel 49 close the upper end of the housing.

In use, the gauge is applied over the nipple or casing 50 of a pneumatic tire valve 51 so that the upper face of the nipple seats against the gasket 22 and the valve 51 enters into the generally coinically shaped mouth 19 of the check-valve stem 18. In this position the valve stem 18 opens tire valve 51. The gauge housing 10 is then pressed downwardly causing the seat 13 to be moved downwardly away from the check-valve head 20, and opening the check-valve 25. This allows air from the tire to enter the duct 26 of the valve stem 18. This air passes out through the duct 27 into the pressure chamber between the upper end of the seat 13 and the diaphragm 30. The pressure of the air against the diaphragm actuates the pointer 40 through the pin 31, crank member 32 and arm 33, causing the pointer to indicate the pressure of the air in the tire upon the dial 42.

As shown in Fig. 5 especially, the mouth 19 of the valve stem is crimped so that the stem 51 of the tire valve cannot enter fully into the mouth 19 and fill the same which would prevent air from escaping from the tire into the valve duct 26.

When the gauge is lifted off the tire nipple 50, the resiliency of the grommet 16 forces the member 15 downwardly immediately, and this member 15 by its engagement with sleeve 17 causes the head 20 of the check-valve 25 to be reseated immediately upon the gasket 13 so that the compressed air from the tire is entrapped in the gauge. The pointer 40 remains, therefore, at the reading of the pressure in the tire; and the user can readily read what the tire pressure is while holding the gauge in his hand after removing it from the tire.

The cup-shaped member 15 is formed exteriorly of housing 10 with a flange 55 around its mouth. To release the air entrapped in the gauge, all that the user has to do is to press upwardly on the flange 55. This causes member 15 to engage shoulder 21 of the valve stem 18 lifting the valve head 20 off of its seat. This allows the entrapped air to escape through the ducts 27 and 26. With the escape of the air from the pressure chamber the pointer 40 returns to zero.

Fig. 3 shows the parts in normal position. Fig. 4 shows the gauge applied to the nipple or valve casing 50 of the tire and the check-valve 25 opened by pressing down on housing 10.

Parts 13, 16 and 22 may be made, of course, of either artificial or natural rubber or of any other suitable elastic material. Instead of a rubber grommet 16 any other suitable resilient means may also be employed such as rubber tubing, or a spring, etc.

With the present invention, a gauge has been provided of simple construction which permits of testing the air pressure in a tire without the necessity of bending over or stooping down to read the gauge. Furthermore, a gauge is provided which is of handy size and which can readily be reset after use.

While the invention has been described in connection with a particular embodiment thereof and a particular use therefor, it is capable of various modifications and uses; and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described our invention, what we claim is:

1. A portable pressure gauge for pneumatic tires comprising a housing having a pressure chamber formed therein, pressure-responsive indicating means, a check valve movably mounted in said housing, a seat in said housing for said valve, said valve, when seated, being adapted to close said chamber, a stem secured to said check valve and adapted to be engaged with a tire valve to open the tire valve, a member slidably mounted on the stem of said check valve and adapted to be seated on the casing of the tire valve to permit the housing to be pressed downwardly relative to said casing to open the check valve to allow air to flow from the tire through the opened tire valve and opened check valve into said chamber, means limiting sliding movement of said member on said check valve in opposite directions, resilient means for pressing against said member to constantly urge said member in one direction and thereby constantly urging said check valve into closed position so that compressed air will be automatically entrapped within said chamber on removal of the gauge from the tire valve casing, said member being manually movable in the opposite direction against the resistance of said resilient means to open said check valve and release the trapped air.

2. A portable pressure gauge for pneumatic tires comprising a housing having a pressure chamber formed therein, pressure-responsive indicating means, a check valve reciprocable in said housing, said check valve having an enlarged head and a stem projecting centrally from one side of the head, a seat in said housing for the head of said valve, said stem extending through a central hole in said seat, said valve, when seated, being adapted to close said chamber, a member slidable on said stem, means limiting the sliding movement of said member relative to the stem in both directions, resilient means interposed between said seat and said member to constantly urge said member in one direction to close said check valve automatically, said member being manually movable in the opposite direction to open said check valve, and a member surrounding said stem and adapted to be engaged with the casing of a tire valve to permit the housing to be pressed downwardly relative to said casing to open the check valve, the stem of the check valve being adapted to be engaged with the tire valve, when the second said member is engaged with the casing of the tire valve, to open the tire valve.

3. A portable pressure gauge for pneumatic tires comprising a housing having a pressure chamber formed therein, pressure-responsive indicating means, a check valve reciprocable in said housing, said check valve having an enlarged head and a stem projecting centrally from one side of the head, a seat in said housing for the head of the valve, said seat having a central hole therein through which the stem projects, an inverted cup-shaped member mounted on the stem to have limited sliding movement on said stem between stops on said stem, resilient means interposed between the seat and said member to constantly urge said member, and with it the valve, in one direction to close the valve automatically, a seating member mounted on said stem within the cup-shaped member and adapted to be engaged with the casing of a tire valve to permit the housing to be pressed downwardly relative to said casing to open the check valve, the stem of the check valve being adapted to be engaged with the tire valve, when the seating member is engaged with the casing, to open the tire valve, said stem having a duct therein through which compressed air may flow from the tire into said chamber when both tire valve and check valve are open, and said cup-shaped member being manually movable against the resistance of said resilient means to open the check valve.

4. A portable pressure gauge for pneumatic tires comprising a housing having a pressure chamber formed therein, pressure-responsive indicating means, a check valve reciprocable in said housing, said check valve having an enlarged head and a stem projecting centrally from one side of the head, a seat in said housing for the head of the valve, said seat having a central hole therein through which the stem projects, an inverted cup-shaped member mounted on the stem to have limited sliding movement on the stem between stops on the stem, resilient means interposed between the seat and said member to constantly urge the member, and with it the valve, in one direction to close the valve automatically, a seating member mounted on said stem within the cup-shaped member and adapted to be engaged with the casing of a tire valve to permit the housing to be pressed downwardly relative to said casing to open the check valve, the stem of the check valve being adapted to be engaged with the tire valve, when the seating member is engaged with the casing, to open the tire valve, said stem having a duct therein through which compressed air may flow from the tire into said chamber when both tire valve and check valve are open, and said cup-shaped member being formed with a flange externally of said housing so that it may be pressed manually inwardly of the housing against the resistance of said resilient means, to open the check valve.

WARREN W. HASTINGS.
ROBERT A. HUNT.

REFERENCES CITED

The following references are of record in the file of this patent:

UNITED STATES PATENTS

| Number | Name | Date |
|---|---|---|
| 1,451,038 | Faries | Apr. 10, 1923 |

FOREIGN PATENTS

| Number | Country | Date |
|---|---|---|
| 22,268 of 1910 | Great Britain | June 1, 1911 |